United States Patent Office 3,520,939
Patented July 21, 1970

3,520,939
PROCESS FOR PREPARING PHOSPHINE OXIDES
James P. Brennan, Bloomington, Ind., assignor to Monsanto Company, St. Louis, Mo., a corporation of Delaware
No Drawing. Continuation-in-part of application Ser. No. 457,177, May 19, 1965. This application Apr. 18, 1968, Ser. No. 722,159
Int. Cl. C07f 9/02
U.S. Cl. 260—606.5                                   19 Claims

ABSTRACT OF THE DISCLOSURE

The present invention relates to and covers processes for preparing tertiary phosphine oxides by the alkaline hydrolysis of a quaternary phosphonium salt. More specifically, such salt having the formula $RR'R''R'''P^+X^-$, like triethyl dodecyl phosphonium chloride is reacted with a base having the formula ROM, like sodium methoxide, at an elevated temperature and in a substantially non-aqueous system to form a phosphine oxide having the formula $RR'R''PO$, like diethyldodecyl phosphine oxide.

---

The present invention was disclosed, in part, in my copending application for Letters Patent, Ser. No. 457,177, filed May 19, 1965, and now abandoned and should be considered in conjunction with the present case which is a continuation-in-part of Ser. No. 457,177.

The present invention relates, in general, to the preparation of teritary phosphine oxide compounds and, more particularly, to the preparation of unsymmetrical tertiary phosphine oxide compounds, especially to the preparation of unsymmetrical aliphatic tertiary phosphine oxide compounds.

In the preparation of unsymmetrical tertiary phosphine oxides, $RR'R''PO$, wherein $R''$ contains at least 5 carbon atoms more than R or R', by the reaction of a quaternary phosphonium salt, $RR'R''R'''P^+X^-$, and sodium hydroxide, to yields of the desired unsymmetrical tertiary phosphine oxide, $RR'R''PO$, are usually quite low due to, among other things, the many possible side products, such as, $RR'R'''PO$, $RR'R'''P$, $R'R''R'''PO$, $R'R''R'''P$, etc., which can be formed in addition to the desired products. As can be appreciated, a method for improving the yields of the desired unsymmetrical tertiary phosphine oxides which are produced in relatively low yields in the aforementioned reaction would represent a significant advancement in this art.

Therefore, it is an object of this invention to provide an improved process for preparing tertiary phosphine oxides.

It is a further object of this invention to provide an improved process for preparing unsymmetrical tertiary phosphine oxides.

It is a further object of this invention to provide a process for preparing unsymmetrical tertiary phosphine oxide in relatively high yields.

It is another object of this invention to provide an improved process for preparing unsymmetrical aliphatic tertiary phosphine oxides.

It is a still further object of this invention to provide a process for preparing unsymmetrical aliphatic tertiary phosphine oxides in relatively high yields.

These and other objects will become more apparent from a reading of the following detailed description.

It has now been unexpectedly found that unsymmetrical tertiary phosphine oxides can be prepared by the reaction of an unsymmetrical quaternary phosphonium halide and an alkali metal alkoxide in relatively high yields and, in some cases, quantitative yields, as will be more fully described hereinafter.

The reaction of the present invention can be represented by the following equation:

(1) $$R_1R_2R_3R_4P^+X^- + R_5OM \longrightarrow R_1R_2R_3R_4\overset{O}{\underset{\uparrow}{P}} + R_3-R_5 + MX$$

wherein: $R_1$ and $R_2$ and $R_3$ are each aliphatic groups containing from 1 to 3 carbon atoms; $R_4$ is selected from the class consisting of aliphatic, alkaryl, and alkarylalkyl groups containing at least 5 carbon atoms more than any of the radicals represented by $R_1$, $R_2$ and $R_3$; X is a halide anion (preferably chlorine or bromine); $R_5$ is an alkyl group containing from 1 to 6 carbon atoms; and M is an alkali metal.

When the symbol $R_4$ represents groups containing carbon chains, such as aliphatic groups, or groups containing alkyl moieties, i.e., alkaryl groups, such carbon chains may be a straight chain structure or branched chain structure. When the symbol $R_4$ represents groups containing unsaturated carbon chains, these chains may contain both double bonds and triple bonds as well as contain more than one of such bonds, although it is preferred that when such symbols represents unsaturated carbon chains they are ethylenically unsaturated and especially mono-ethylenically unsaturated. When the symbol $R_4$ represents groups containing aromatic carbon rings such as groups containing aryl moieties, i.e., alkaryl groups, such carbon rings are preferably mono-, di- ring groups, although multiring groups containing more than 2 rings, i.e., 3 to 5 or even more can be utilized in the practice of the present invention. Although the aliphatic groups represented by $R_1$, $R_2$ and $R_3$ may be like or unlike, it is preferred that each of the groups be the same and for the group represented by $R_4$ it is preferred that such contain not over about 30 carbon atoms. In addition, when the group represented by $R_4$ contains substituents, it is preferred that the substituents not be on the carbon atom attached to the P atom in the R—C—P bond linkage of the phosphonium salt. In addition, all of the foregoing groups represented by $R_4$ may contain one or more of the following substituents: hydroxy groups, amino groups, amide groups, ether groups, ester groups, carboxy groups, sulfonyl groups, sulfo groups and nitro groups.

It has been found that although the process of the present invention can use unsymmetrical quaternary phosphonium halides wherein $R_1$, $R_2$ and $R_3$ are aliphatic groups containing from 1 to 3 carbon atoms, when such substituents contain hydrocarbyl groups, such as aliphatic groups, containing 4 or more carbon atoms, the yields of the desired unsymmetrical tertiary phosphine oxide are quite low and by-products such as the tertiary phosphines are oftentimes formed in substantial yields.

In order to carry out the process of the present invention all that is required, in general, is to heat the reactants together preferably in the presence of an inert organic oxygenated solvent, such as an alcohol, ketone, ether and the like (with an alcohol solvent, such as a mono-and/or di-hydric alcohol, being preferred) until the desired reaction product has formed. Typical of such alcohols include the following: methanol, ethanol, 2-propanol, 2-propen-1-ol, 1-propanol, 2-butanol, 2-fluoroethanol, 3-pentanol, 3,3-dimethyl-2-butanol, 3-methyl-3-pentanol, 2 - methoxyethanol, 1-chloro-2-propanol, 2-ethoxyethanol, 3-hexanol, 1-pentanol, cyclopentanol, 3-hydroxy-2-butanone, 2-bromoethanol, 1-hexanol, 2-methyl cyclohexanol, furfuryl alcohol, 2-octanol, 2-ethyl-1-hexanol, 2,3-butanediol, 2-methyl-1,2-propanediol, cyclohexyl - carbinol, 1,2 - propanediol, 2-(2-methoxyethoxy)-ethanol, and glycol. Typical of such ketones include the following: acetone, 3-butan-2-one, 2-butanone, butane-2, 3-dione, cyclobutanone, 3-pentanone, 1-pentan-3-one, 3,3-dimethyl-2-butanone, 1-methoxy-2-propanone, 1-chloro-2-propanone, 2-methyl-1-pentan-3-one, and neopenthylmethyl ketone. Typical of such ethers include the following: tert-butyl ethyl ether, chloromethylether, ethyl-isobutylether, sec-butyl ethyl ether, isoproply-n-proplylether, ethyleneglycol dimethyl ether, ethylene glycol ethyl methyl ether, cyclopentyl methyl ether, ethylene glycol methyl n-proxyl ether, ethylene glycol monoethyl ether, diethylene glycol dimethyl ether, ethylene glycol mono-n-butyl ether and phenyl isophopyl ether. An especially preferred method for carrying out the process of the present invention is to form the alkali metal alkoxide in situ in the reaction medium by adding the alkali metal into excess quantities of the alcohol reaction medium to form the desired alkali metal alkoxide. For example, when an alkali metal alkoxide, such as sodium methoxide, is used, a solvent such as methanol is preferably used as the inert organic reaction medium.

One of the most important aspects of the present invention is that the reaction system which contains the starting materials must be substantially completely anhydrous in order to achieve the high yields which have not been obtainable by the prior art in preparing non-related (to the present invention) tertiary phosphine oxides.

The reactants are preferably used in substantially stoichiometric amounts, although excess amounts of the alkali metal alkoxide, that is, amounts in excess of stoichiometry by greater than about 10% by weight of the reactants, and even higher, such as, amounts in excess of 50% and 100%, may be advantageously used in some cases.

In general, the reaction of the present invention may be carried out at any conventional temperature, although at room temperature the rate of reaction of the reactants is extremely slow and, therefore, the reaction is preferably carried out at elevated temperatures, that is, above about 50° C. In particular, temperatures above about 85° C. but below the decomposition temperature of any of the reactants is suitable, with temperatures in the range of about 100° C. to about 150° C. being preferred although even higher temperatures can be used, especially if increased pressures are utilized. Especially preferred are temperature conditions which permit the reaction to be carried out by refluxing the reactants until the desired reaction has been completed.

A preferred method for carrying out the reaction of the present invention is to add the unsymmetrical quaternary phosphonium halide to an inert oxygenated organic solvent containing the alkali metal alkoxide and intermixing the reactants; the solvent is then removed from the reactants by means such as distillation and the residue is continued to be heated at an appropriate temperature until the desired unsymmetrical phosphine oxide is prepared. In general, times for the reaction vary depending upon, inter alia, reactants, solvent, and temperatures used, however, generally the reaction is completed in less than about 4 hours, with times from about 30 minutes to about 2 hours usually being sufficient. The desired product usually contains the by-product salt as a contaminant and such can be purified by extraction with a suitable organic solvent, such as, tetrahydrofuran, and recrystallized by removing the solvent.

Typical of the alkali metal alkoxides contemplated for use herein include: sodium ethoxide, sodium methoxide, sodium propoxide, soduim butoxide, potassium methoxide, potassium ethoxide, potassium propoxide, potassium butoxide, lithium methoxide, lithium ethoxide, lithium propoxide and the like. Other alkali metals alkoxides can also be used such as rubidium alkoxides although the sodium-and potassium-alkoxides are preferred and especially sodium-and-potassium-methoxide and ethoxide with sodium methoxide and sodium ethoxide being especially preferred.

Typical of the unsymmetrical quaternary phosphonium halide contemplated for use herein include:

triethyl p-tolyl phosphonium bromide
trimethyl propylphenyl phosphonium bromide
methyl, diethyl phenylvinyl phosphonium iodide
ethyl, dimethyl octene-1 phosphonium chloride
methyl, di-n-propyl hexylphenyl phosphonium bromide
trimethyl xylyl phosphonium bromide
trimethyl butlyphenyl phosphonium bromide
trimethyl butylphenylbutyl phosphonium bromide
triethyl octadecylphenyl phosphonium chloride
trimethyl n-octyl phosphonium chloride
triethyl dodecyl phosphonium bromide
trimethyl tetradecyl phosphonium iodide
triethyl oleyl phosphonium chloride
tripropyl decyl phosphonium chloride
trimethyl nonyl phosphonium bromide
triethyl propylbenzyl phosphonium chloride
tripropyl tetradecylbenzyl phosphonium bromide
trimethyl dodecynyl phosphonium chloride
trimethyl methylphenltetradecyl phosphonium bromide
trimethyl tetradecynyl phosphonium chlroide The unsymmetrical quaternary phosphonium halides can be prepared by, in general, reacting a tertiary phosphine and an organic halide by the following equation:

(2) $\quad R_1R_2R_3P + R_4X \rightarrow R_1R_2R_3R_4P^+X^-$ where the radicals represented by $R_1$, $R_2$, $R_3$ and $R_4$ are the same as in Equation 1. The reaction can be carried out at temperature in the range of about 0° C. to about 170° C. If desired, the reaction can be carried out in the presence of an inert solvent such as acetic acid, acetone, an alcohol, acetonitrile and the like in which case the temperature used should not exceed the reflux temperature of the solvent.

A particularly valuable group of unsymmetrical tertiary phosphine oxides which are useful as synthetic detergents in aqueous systems and which can be prepared in high yields by following the teachings of the instant invention are the unsymmetrical aliphatic tertiary phosphine oxides of the general formula $R_1R_2R_4PO$ prepared from the unsymmetrical quaternary phosphonium halides according to the general Equation 1, wherein $R_1$ and $R_2$ are lower alkyl groups containing from 1 to 3 carbon atoms, and $R_4$ is a higher aliphatic group containing from about 8 carbon atoms to about 20 carbon atoms with $R_4$ containing at least 5 carbon atoms more than the radicals represented by $R_1$ and $R_2$. Compounds illustrative of such phosphine oxides include the following:

dimethyl-n-octyl phosphine oxide
dimethyl-n-nonyl phosphine oxide
dimethyl-n-dodecyl phosphine oxide
dimethyl-n-decyl phosphine oxide
methyl ethyl n-dodecyl phosphine oxide
di-n-propyl-n-dodecyl phosphine oxide
di-n-propyl-n-decyl phosphine oxide
dimethyl-n-octadecyl phosphine oxide
diethyl-n-hexadecyl phosphine oxide
dimethyl-oleyl phosphine oxide
di-n-propyl-n-tetradecyl phosphine oxide
di-n-propyl-n-decyl phosphine oxide The following examples are presented to illustrate the invention with parts by weight being used in the examples unless otherwise indicated.

EXAMPLE I

A quantity of about 45.6 grams of trimethyl phosphine and about 150 grams of dodecyl bromide are added to a suitable reaction vessel and heated to about 130° C. for about 4 hours yielding dimethyl dodecyl phosphonium bromide, a white solid (M.P. 193° C.).

A quantity of about 90 grams of trimethyl dodecyl phosphonium bromide prepared above is added to an ethanol solution containing sodium exthoxide, prepared by adding sodium metal (6.4 grams) to absolute ethanol (600 cc.). The ethanol is distilled off and the residue is continued to be heated to about 100° C. for about 60 minutes. $P^{31}$ NMR analysis indicates quantitative yields of the desired phosphine oxide product. The reaction product is dissolved in tetrahydrofuran, the sodium bromide is removed by filtration, and the desired product, dimethyl dodecyl phosphine oxide, (yield about 75%) is recrystallized by partially removing the solvent.

EXAMPLE II

A quantity of about 236 grams of triethyl phosphine and about 560 grams of tetradecyl chloride are added to a suitable reaction vessel and heated to about 150° C. for about 3 hours yielding triethyl dodecyl chloride.

A quantity of about 322 grams of triethyl tetradecyl phosphonium chloride prepared above is added to an isopropanol solution containing about 100 grams of sodium isopropoxide. The isopropanol is distilled off and the residue is continued to be heated to about 120° C. for about 60 minutes. Analysis of the reaction product by $P^{31}$ NMR indicates over 90% of the desired phosphine oxide, diethyl tetradecyl phosphine oxide, is formed.

EXAMPLE III

A quantity of about 148 grams of tri-n-propyl phosphine and about 638 grams of oleyl bromide are added to a suitable reaction vessel and heated to about 150° C. for about 4 hours yielding tri-n-propyl oleyl phosphonium bromide.

A quantity of about 500 grams of tri-n-propyl oleyl phosphonium bromide prepared above is added to a methanol solution containing sodium methoxide, prepared by adding sodium metal (60 grams) to methanol (3,000 cc.). The methanol is distilled off and the residue is continued to be heated to about 110° C. for about 60 minutes. The reaction product is dissolved in tetrahydrofuran, the sodium bromide is removed by filtration, and the desired product, dipropyl oleyl phosphine oxide (yield about 75%), is recrystallized by partially removing the solvent.

EXAMPLE IV

A quantity of about 236 grams of triethyl phosphine and about 678 grams of dodecyl benzyl bromide are added to about 5 liters of glacial acetic acid with the temperature maintained at about 50° C. The reactant mixture is allowed to stand for about 12 hours at room temperature (about 25° C.) and the solids produced are removed by filtration and dried to recover triethyl dodecylbenzyl phosphonium bromide.

A quantity of about 300 grams of trimethyl dodecylphenyl phosphonium bromide prepared above is added to about 90 grams of potassium ethoxide in excess acetone. The acetone is distilled off until the residue is substantially dry and heating at about 90° C. is continued for about 30 minutes. Analysis of the reaction product by $P^{31}$ NMR indicates over 80% of the desired phosphine oxide, dimethyl dodecylbenzyl phosphine oxide, is formed.

EXAMPLE V

A quantity of about 236 grams of triethyl phosphine and about 252 grams of tolylchloride are added to about 500 ml. of ethanol at room temperature (about 25° C.). The mixture is refluxed (about 80° C.) for about 30 minutes, cooled to room temperature (about 25° C.) and the resulting solids filtered and dried to recover triethyl tolyl chloride.

A quantity of about 210 grams of triethyl tolyl phosphonium chloride prepared above is added to about 100 grams of potassium propoxide in excess phenyl isopropyl ether and heated to about 120° C. for about 3 hours. Analysis of the reaction product of $P^{31}$ NMR indicates over 80% of the desired phosphine oxide, diethyl tolyl phosphine oxide, is formed.

EXAMPLE VI

A quantity of about 236 grams of triethyl phosphine and about 734 grams of tetradecyl benzyl bromide are added to about 5 liters of acetic acid with the temperature maintained at about 50° C. The reactant mixture is allowed to stand for about 12 hours at room temperature (about 25° C.) and the solids produced are removed by filtration and dried to recover triethyl tetradecylbenzyl bromide.

A quantity of about 485 grams of triethyl tetradecylbenzyl phosphonium bromide prepared above is added to about 100 grams of sodium methoxide in excess glycol and heated to about 135° C. for about 3 hours. Analysis of the reaction product by $P^{31}$ NMR indicates over 70% of the desired phosphine oxide diethyl tetradecylbenzyl phosphine oxide, is formed.

A quantity of about 152 grams of trimethyl phosphine and about 728 grams of dodecylphenylhexyl chloride are added to a suitable reaction vessel and heated to about 150° C. for about 6 hours yielding trimethyl dodecylphenylhexyl chloride.

A quantity of about 440 grams of trimethyl dodecylphenylhexyl phosphonium chloride prepared above is added to a methanol solution containing sodium methoxide in amounts of about 20% by weight of the reactants in excess over stoichiometric. The methanol is distilled off and the residue is continued to be heated to about 100° C. for about 2 hours. The reaction product is dissolved in tetrahydrofuran, the sodium chloride is removed by filtration, and the desired product, dimethyl dodecylphenylhexyl phosphine oxide, (yield in excess of 70%) is recrystallized by partially removing the solvent.

EXAMPLE VIII

A quantity of about 152 grams of trimethyl phosphine and about 648 grams of dodecylphenyl bromide are added to a suitable reaction vessel and heated to about 150° C. for about 5 hours yielding trimethyl dodecylphenyl phosphonium bromide.

A quantity of about 400 grams of trimethyl dodecylphenyl phosphonium bromide prepared above is added to a methanol solution containing about 100 grams of sodium methoxide. The methanol is distilled off and the residue is continued to be heated at 100° C. for about 2 hours. Analysis of the reaction product by $P^{31}$ NMR indicates over 70% of the desired phosphine oxide, dimethyl dodecylphenyl phosphine oxide, is formed.

EXAMPLE IX

A quantity of about 236 grams of triethyl phosphine and about 352 grams of decylphenyl chloride are added to a suitable reaction vessel and heated at about 100° C. for about 12 hours yielding triethyl decylphenyl phosphonium chloride.

A quantity of about 370 grams of triethyl decylphenyl phosphonium chloride prepared above is added to an ethanol solution containing about 100 grams of sodium ethoxide. The ethanol is distilled off and the residue is continued to be heated at about 100° C. for about 2 hours. Analysis of the reaction product by $P^{31}$ NMR indicates over 75% of the desired phosphine oxide, diethyl decylphenyl phosphine oxide, is formed.

EXAMPLE X

A quantity of about 152 grams of trimethyl phosphine and about 386 grams of octylbromide are added to a suitable reaction vessel and heated to about 90° C. for about 10 hours yielding trimethyl octyl phosphonium bromide.

A quantity of about 270 grams of trimethyl octyl phosphonium bromide prepared above is added to an ethanol solution containing about 80 grams of sodium ethoxide. The ethanol is distilled off and the residue is continued to be heated to about 100° C. for about 2 hours. The reaction product is dissolved in tetrahydrofuran, the sodium bromide is removed by filtration, and the desired product, dimethyl octyl phosphine oxide, (yield about 80%) is recrystallized by partially removing the solvent.

Compounds which can be prepared according to the improved process herein under substantially similar conditions as those described in the foregoing examples include:

diethyl dodecyl phosphine oxide
diethyl octyl phosphine oxide
dimethyl hexylphenyl phosphine oxide
diethyl xylyl phosphine oxide
dipropyl hexadecyl phosphine oxide
dimethyl 3-phenylpropyl phosphine oxide
diethyl 3-phenylamyl phosphine oxide
diethyl undecyl phosphine oxide
methyl, ethyl, dodecyl phosphine oxide
dimethyl decynyl phosphine oxide
diethyl noyl phosphine oxide
diethyl 12-phenyldodecyl phosphine oxide
dimethyl dodecynyl phosphine oxide
diethyl tetradecynyl phosphine oxide
dimethyl butylphenyl phosphine oxide
diethyl octadecyl phosphine oxide
diethyl propylbenzyl phosphine oxide
dipropyl tetradecylphenyl phosphine oxide
dimethyl methylphenyldecyl phosphine oxide
dipropyl methylphenylbutyl phosphine oxide
dimethyl tetradecylbenzyl phosphine oxide
dimethyl decylbenzyl phosphine oxide
diethyl octylbenzyl phosphine oxide
diethyl methylphenyloctadecyl phosphine oxide
diethyl octynyl phosphine oxide In conjunction Examples I through V, each example was carried out in an anhydrous system in order to achieve the high yields as heretofore mentioned.

In conjunction with the preparation of the alkali metal alkoxide, it is also within the scope of the present invention that said alkoxide can be prepared by reacting an anhydrous alkali metal hydroxide such as sodium or potassium hydroxide with the particular inert organic oxygenated solvent heretofore described.

It is to be understood that the terms "anhydrous system" or "substantially anhydrous system" connotate that no water is added to the system, i.e. only the reactants are used in the system. For example, Example I, heretofore disclosed, is repeated using trimethyl dodecyl phosphonium bromide, anhydrous sodium hydroxide and absolute ethanol to form dimethyl dodecyl phosphine oxide. However, when Example I is repeated and there is added 100 ml. of water (in addition to the above stated reactants), the yield of the phosphine oxide is less than 38%.

What is claimed is:

1. A process for preparing an unsymmetrical tertiary phosphine oxide comprising reacting an unsymmetrical phosphonium halide having the formula

wherein $R_1$ $R_2$ and $R_3$ are each aliphatic groups containing from 1 to 3 carbon atoms, $R_4$ is selected from the class consisting of aliphatic, alkaryl and alkarylalkyl groups containing at least 5 carbon atoms more than any of the radicals represented by $R_1$, $R_2$ and $R_3$ and X is a halide anion, with an alkali metal alkoxide having the formula $R_5OM$ wherein $R_5$ is an alkyl group containing from 1 to 6 carbon atoms and M is an alkali metal; said process being carried out at elevated temperatures and in a substantially anyhdrous system whereby said unsymmetrical tertiary phosphine oxide is prepared in relatively high yields.

2. The process of claim 1, wherein said halide anion is selected from the group consisting of chloride and bromide.

3. The process of claim 2, wherein said reaction is carried out at temperatures from about 100° C. to about 150° C.

4. The process of claim 3, wherein said reaction is carried out by intermixing the reactants in an inert oxygenated solvent, removing the solvent by distillation and heating the residue at temperatures from about 100° C. to about 150° C.

5. The process of claim 4, wherein said alkali metal alkoxide is selected from the group consisting of sodium methoxide, sodium ethoxide, potassium methoxide and potassium ethoxide.

6. A process for preparing an unsymmetrical aliphatic tertiary phosphine oxide comprising reacting an unsymmetrical phosphonium halide having the formula

wherein $R_1$, $R_2$ and $R_3$ are each lower alkyl groups containing from 1 to 3 carbon atoms, $R_4$ is an aliphatic group containing from about 8 carbon atoms to about 20 carbon atoms and X is a halide anion, with an alkali metal alkoxide having the formula $R_5OM$ wherein $R_5$ is an alkyl group containing from 1 to 6 carbon atoms and M is an alkali metal; said process being carried out at elevated temperatures and in a substantially anhydrous system whereby said unsymmetrical tertiary phosphine oxide is prepared in relatively high yields.

7. The process of claim 6, wherein said halide anion is selected from the group consisting of chloride and bromide.

8. The process of claim 7, wherein said reaction is carried out at temperatures from about 100° C. to about 150° C.

9. The process of claim 8, wherein said reaction is carried out by intermixing the reactants in an inert oxygenated solvent, removing the solvent by distillation and heating the residue at temperatures from about 100° C. to about 150° C.

10. The process of claim 9, wherein said alkali metal alkoxide is selected from the group consisting of sodium methoxide, sodium ethoxide, potassium methoxide and potassium ethoxide.

11. The process of claim 10, wherein said unsymmetrical quaternary phosphonium halide is trimethyl dodecyl phosphonium bromide.

12. The process of claim 10, wherein said unsymmetrical quaternary phosphonium halide is triethyl dodecyl phosphonium chloride.

13. A process for preparing an unsymmetrical tertiary phosphine oxide comprising reacting a tertiary phosphine having the formula $R_1R_2R_3P$ wherein $R_1$, $R_2$ and $R_3$ are each aliphatic groups containing from 1 to 3 carbon atoms with an organic halide having the formula $R_4X$ wherein $R_4$ is selected from the class consisting of aliphatic, alkaryl, and alkarylalkyl groups containing at least 5 carbon atoms more than any of the radicals represented by $R_1$, $R_2$ and $R_3$ whereby an unsymmetrical quaternary phosphonium halide is formed, and thereafter reacting said unsymmetrical quaternary phosphonium halide with an alkali metal alkoxide having the formula $R_5OM$ wherein $R_5$ is an alkyl group containing from 1 to 6 carbon atoms and M is an alkali metal; said reaction of said unsymmetrical quaternary phosphonium halide and said alkali metal alkoxide being carried out at elevated temperatures and in a substantially anhydrous system whereby said unsymmetrical tertiary phosphine oxide is prepared in relatively high yields.

14. The process of claim 13, wherein said alkali metal alkoxide is selected from the group consisting of sodium methoxide, sodium ethoxide, potassium methoxide and potassium ethoxide.

15. A process for preparing an unsymmetrical aliphatic tertiary phosphine oxide comprising reacting a tertiary phosphine having the formula $R_1R_2R_3P$ wherein $R_1$, $R_2$ and $R_3$ are each alkyl groups containing from 1 to carbon atoms with an aliphatic halide containing from 8 to about 20 carbon atoms whereby an unsymmetrical quaternary phosphonium halide is formed, and thereafter reacting said unsymmetrical quaternary phosphonium halide with an alkali metal alkoxide having the formula $R_5OM$ wherein $R_5$ is an alkyl group containing from 1 to 6 carbon atoms and M is an alkali metal, said reaction of said unsymmetrical quaternary phosphonium halide with said alkali metal alkoxide being carried out at elevated temperatures and in a substantially anhydrous system whereby said unsymmetrical aliphatic tertiary phosphine oxide is prepared in relatively high yields.

16. The process of claim 15, wherein said alkali metal alkoxide is selected from the group consisting of sodium methoxide, sodium ethoxide, potassium methoxide and potassium ethoxide.

17. The process of claim 16, wherein said reaction of said unsymmetrical quaternary phosphonium halide and said alkali metal alkoxide is carried out by intermixing the reactants in an inert oxygenated solvent, removing the solvent by distillation and heating the residue at temperatures from about 100° C. to about 150° C.

18. The process of claim 17, wherein said aliphatic halide is trimethyl dodecyl phosphonium bromide.

19. The process of claim 17, wherein said aliphatic halide is triethyl dodecyl phosphonium chloride.

References Cited

UNITED STATES PATENTS 3,325,546   6/1967   Hays _____ 260—606.5

OTHER REFERENCES

Beflin et al., Chem. Reviews, vol. 60, No. 3, (1960), p. 248, 260–606.5.
Parisek, J.A.C.S., vol. 82, (1960), pp. 5503–4.
Grayson et al., J.A.C.S., vol 82, (1960), pp. 3919–24.

TOBIAS E. LEVOW, Primary Examiner

W. F. W. BELLAMY, Assistant Examiner

PO-1050
(5/69)

UNITED STATES PATENT OFFICE
CERTIFICATE OF CORRECTION

Patent No. 3,520,939                    Dated July 21, 1970

Inventor(s)    James F. Brennan

It is certified that error appears in the above-identified patent and that said Letters Patent are hereby corrected as shown below:

Column 4, line 72, the word now shown as "dimethyl" should read --trimethyl--.
Column 5, line 51, the figures reading "300" should read --390--.
Column 6, line 17, the words "EXAMPLE VII" were omitted and should be inserted; line 59, the figures reading "100°" should read --110°--.

Signed and sealed this 25th day of April 1972.

(SEAL)
Attest:

EDWARD M. FLETCHER, JR.                 ROBERT GOTTSCHALK
Attesting Officer                       Commissioner of Patents